July 30, 1957
W. C. HEATH
2,800,860
APPARATUS FOR MOUNTING A PUMP AND MOTOR
UNIT ON A PRESSURE TANK
Filed April 4, 1955
2 Sheets-Sheet 2
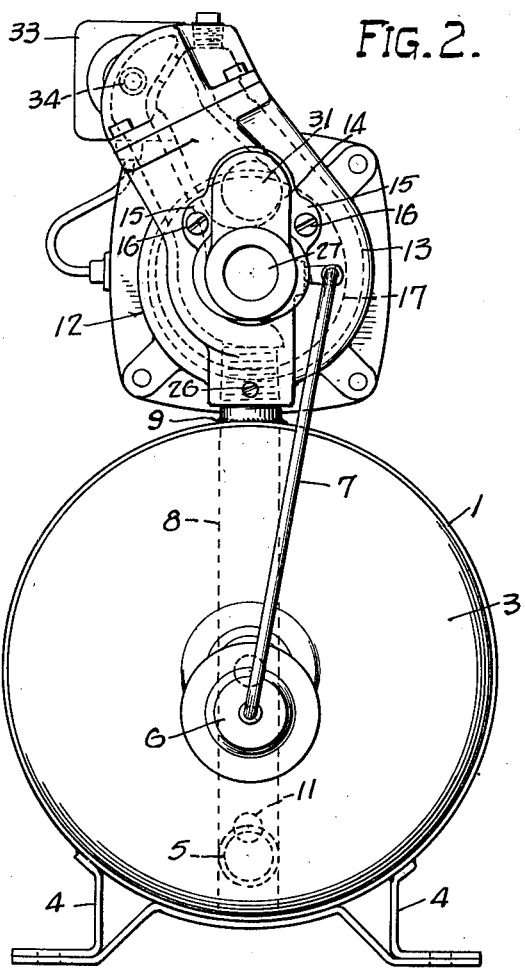
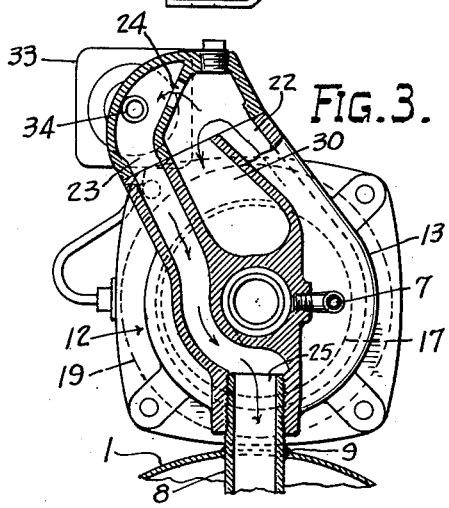
INVENTOR.
William C. Heath
BY
ATTORNEYS.

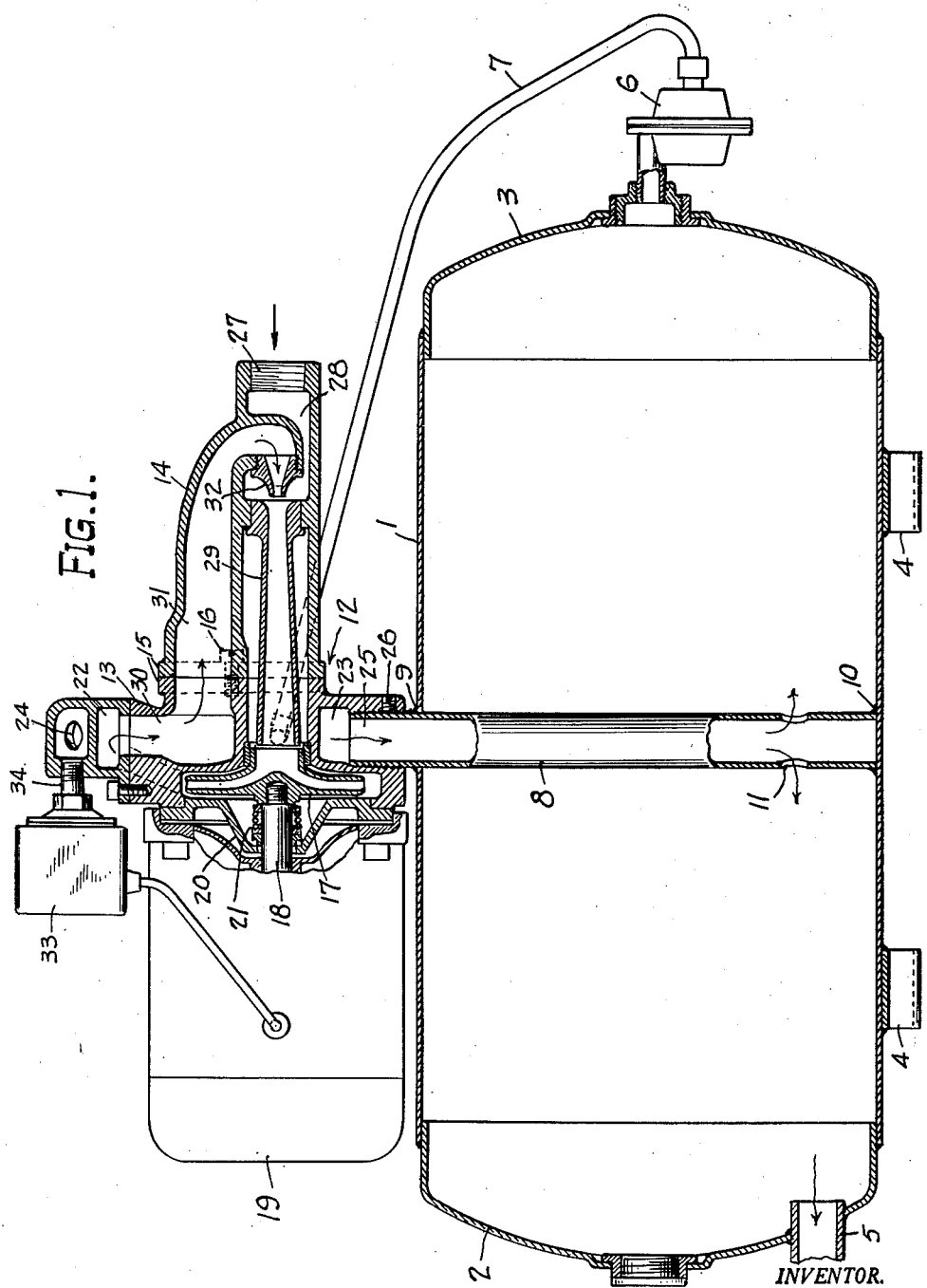

United States Patent Office 2,800,860
Patented July 30, 1957

2,800,860
APPARATUS FOR MOUNTING A PUMP AND MOTOR UNIT ON A PRESSURE TANK

William C. Heath, Milwaukee, Wis., assignor to W. C. Heath Associates Inc., Milwaukee, Wis., a corporation of Wisconsin Application April 4, 1955, Serial No. 498,915

4 Claims. (Cl. 103—218)

This invention relates to a pumping system and more particularly to a mounting for a pump and motor unit on a pressure tank.

In a conventional residential pumping system, the motor and pump unit are generally mounted on a supporting stand adjacent or on a pressure tank, and the pump liquid is discharged from the pump and introduced into the lower end portion of the pressure tank. This system requires mounting brackets and a support for the motor-pump unit and a length of piping to conduct the water from the pump to the pressure tank.

The present invention is directed to a means for mounting a pump and motor unit on a pressure tank which eliminates the need for supports and brackets and reduces the length of piping required to conduct the liquid or other fluid to be pumped from the pump to the tank.

According to the invention, a generally straight length of conduit is secured within an opening in the pressure tank and the outer end of the conduit is connected to the discharge outlet of the pump. The conduit extends through one wall of the tank and diametrically across the tank, and the inner end of the conduit is secured to the interior surface of the tank. Outlet ports are provided in the pipe adjacent the inner end thereof. With this construction the conduit serves not only to conduct water from the pump to the pressure tank but also serves as the sole support for the pump and motor unit.

As the pump and motor unit is located immediately adjacent the tank, the exposed portion of the conduit extending between the pump and the tank is minimized, thereby reducing the length of piping needed to conduct the water from the pump to the lower portion of the tank. In addition, the labor and time required for assembly of the pump and motor unit to the tank is substantially reduced for the conduit is an integral part of the tank and only a single threaded connection is required between the pump and conduit, and the usual elbows, couplings and supporting brackets employed in a conventional system are eliminated.

The use of the conduit as the support for the pump and motor unit results in a less rigid connection between the unit and the pressure tank, thereby reducing the noise and vibration of the pumping operation.

The accompanying drawings illustrate the best mode presently contemplated of carrying out the invention.

In the drawings:

Figure 1 is a side elevation of the apparatus of the present invention with parts broken away in section;

Fig. 2 is an end view of the apparatus; and

Fig. 3 is a fragmentary transverse section of the pump.

The drawings illustrate an apparatus for connecting a pumping unit to a pressure storage tank, such as that employed in a residential water system. The tank includes a generally cylindrical shell 1 which is enclosed at the ends by heads 2 and 3. The tank is supported on a foundation or the like by a pair of sheet metal legs 4.

Water is discharged from the tank through an outlet 5 which is secured within an opening in the lower portion of head 2.

To maintain a cushion of air in the upper portion of the tank above the liquid contained therein, a conventional air volume control 6 is secured to a fitting in the head 3 and communicates with the interior of the tank. A conduit 7 extends from the air volume control to a source of negative pressure, such as the inlet side of the pump, in order to provide a pressure differential necessary to introduce and control the amount of air in the tank.

According to the invention, a vertically disposed pipe 8 is secured within a suitable opening in the upper portion of shell 1 of the tank by weld 9. The pipe 8 extends diametrically across the tank and the lower end of the pipe is secured to the inner surface of the tank by weld 10. Weld 9 serves to seal the pipe within the opening in the tank and also prevents rotation and displacement of the pipe with respect to the tank, while weld 10 functions to firmly position the inner end of the pipe and counteracts any moment arm produced when the outer end of the pipe is subjected to an external force.

To establish communication between the interior of the pipe and the tank, a pair of outlet ports 11 are provided in the lower end portion of the pipe beneath the normal water level of the liquid within the tank. The liquid entering pipe 8 passes downwardly and is discharged from the pipe through ports 11 into the tank.

The upper end of the pipe 8 projects outwardly of the shell 1 of the tank and is connected to the discharge outlet of a pump 12 to support the pump and also provide a passage for the flow of liquid from the pump to the pressure tank. The pump 12, as shown in the drawings, is of conventional jet-type design and includes a volute casing 13 and an ejector body 14 which are joined together to provide a housing for the pump. The adjacent ends of the casing 13 and body 14 are provided with matching flanges 15 or ears which are secured together by bolts 16 or the like.

The volute casing 13 houses an impeller 17 which is mounted on the drive shaft 18 of a motor 19. To seal the motor against leakage of the pumped liquid, a cup-shaped seal plate 20 is secured to the end of casing 13 and houses a conventional mechanical seal 21 which is disposed about the drive shaft 18 and serves to prevent outward leakage of the liquid along the shaft.

The casing 13 defines a chamber 22, into which the liquid is discharged from the volute containing the impeller. The casing 13 also defines a discharge passage 23 and the chamber 22 and passage 23 are connected by an opening 24 formed in the inner wall of the casing. An outlet 25 extends between the end of discharge passage 23 and the exterior of casing 13 and is provided with an internal tapered thread to threadedly receive the upper end of the pipe 8.

To lock the casing 13 against rotation with respect to the pipe 8, a set screw 26 is threadedly engaged within an opening in the casing and bears against the outer surface of the pipe 8 to prevent rotation of the casing.

Water is drawn into the impeller from the well through an inlet 27 formed in the outer end of body 14. The outer portion of body 14 defines an inlet chamber 28 and a venturi tube 29 is secured to the walls of body 14 and provides communication between the inlet chamber 28 and the impeller 17.

To drive the incoming liquid through the body 14 a portion of the pumped liquid is recirculated through the body and is ejected into the venturi tube 29 with a jet action. To accomplish this, the casing 13 is provided with a return passage 30 which connects the chamber 22 and a passage 31 formed in the ejector body 14. A nozzle 32 is disposed in passage 30 immediately adjacent the outer end of the venturi tube 29. With this construction a portion of the pumped liquid is recirculated through passages 30 and 31 and is discharged through nozzle 32 into the venturi tube, thus creating a pressure differential sufficient to draw liquid into the body 14 through inlet 28.

To actuate the motor 19 in response to predetermined pressure limits in the tank, a conventional pressure switch 33 is electrically connected to the motor. A nipple 34 establishes communication between the switch 33 and the discharge passage 23, and the switch is actuated in a conventional manner in accordance with the pressure conditions in passage 23 to operate the motor and pump when the pressure in passage 23 and the tank falls below a predetermined limit and to shut off the motor and pump when the pressure is increased to a predetermined value.

The present invention provides a simple and inexpensive means of connecting a pump and motor unit to a pressure storage tank. The pump is secured to the outer end of the inlet pipe 8 which extends diametrically across the tank and serves to conduct the pumped liquid to the tank as well as support the pump and motor unit. This construction results in a substantial savings in the cost and labor of assembly, for the pipe 8 is a straight, continuous length and no elbows or couplings are required in the piping system and it eliminates the use of a separate support and mounting brackets for the pump and motor.

As the pipe 8 extends across the tank and is secured to opposite locations on the tank wall, the rigidity of the tank is increased and this reduces the tendency for the shell of the tank to fluctuate in diameter or "breathe" as the motor and pump are operated. This increased rigidity of the tank in combination with the single connection between the pump and motor unit and the tank, namely pipe 8, substantially reduces the vibrational noise of pumping.

The pipe 8 is sealed within the shell 1 of the tank by weld 9 which prevents leakage from the tank and also serves to prevent rotation or displacement of the pipe. As the pipe extends chordwise or diametrically across the tank and is secured to the inner surface portion thereof by weld 10, the moment arm produced by the unbalanced weight of the motor and pump acting on the pipe will be substantially counteracted. In addition, the portion of the exposed pipe between the volute casing 13 and the shell 1 is at a minimum and this also aids in preventing bending or deformation of the upper portion of the pipe 8 which projects outwardly of the tank.

While the above description is directed to a pressure tank having a generally horizontal axis, it is contemplated that the tank can be disposed so that its axis is vertical. Similarly, the pipe 8 which supports the pump and motor can either be positioned vertically as shown, or it may extend horizontally into the lower portion of the tank.

It is also contemplated that the apparatus of the present invention can be employed with an evacuating system rather than a pumping system. In this event the outer end of the pipe 8, which extends across the tank or accumulator, would be connected to the inlet of the pump, and fluid would be pumped out of the tank rather than into the tank.

Various modes of carrying out the invention are contemplated as within the scope of the following claims particularly pointing out and distinctly claiming the subject matter which is regarded as the invention.

I claim:

1. In a pumping system, a closed storage tank having an opening through one wall thereof, a motor pump unit disposed immediately adjacent the tank with said unit having a fluid inlet opening and a fluid outlet opening therein, conduit means connected to said unit at one of said openings in pump portion of said unit and extending through the opening in said tank to the interior of the tank with the center of mass of said unit being displaced a substantial distance from the axis of the conduit means to produce a moment arm about said conduit means, means to secure said conduit means within the opening in the tank, and separate means for connecting the conduit means to the tank at a location spaced from the opening in the tank to firmly secure the conduit means to the tank and resist said moment arm and prevent displacement of the conduit means and said unit.

2. In a pumping system, a generally cylindrical closed storage tank having an opening through one wall thereof, a pump having an inlet opening to receive liquid and an outlet opening to discharge the same, a motor connected to the pump to drive the same, and a generally straight continuous length of conduit disposed within the tank and extending diametrically across the same with the center of mass of the motor and pump being displaced a substantial distance from the axis of the conduit to produce a moment arm about said conduit, said conduit having an opening therein to provide communication between the interior of the conduit and the interior of the tank, one end of said conduit being secured to the inner surface of the tank to resist said moment arm and displacement of the conduit and the other end of the conduit extending outwardly through the opening in the tank, means to seal the conduit within the opening in the tank, and means for connecting the outer end of the conduit directly to the pump at one of said openings in the pump, said conduit providing a short passage for the fluid between the pump and the tank and providing the sole support for the pump and the motor from the tank.

3. A pumping system comprising, a pressure storage tank having inlet and outlet openings therein, a motor pump unit with the pump having an inlet to receive liquid and an outlet to discharge the same and the motor connected to the pump to drive the same, and a generally straight length of conduit disposed chordwise across the tank and having an opening therein to provide communication between the conduit and the interior of the tank, one end of said conduit extending through the inlet opening in said tank and being connected directly to the outlet of the pump to provide a passage for the liquid from the pump to the tank, the center of mass of the motor pump unit being displaced a substantial distance from the axis of the conduit to produce a moment arm about said conduit, means for sealing the conduit within the inlet opening of the tank, and means for connecting the other end of the conduit to the inner surface of the tank to resist said moment arm and prevent displacement of the conduit.

4. In a pumping system, a pressure storage tank having an opening in the upper portion thereof, a motor-pump unit disposed immediately adjacent the tank with the pump having an outlet opening therein axially aligned with the opening in the tank, a generally vertical conduit secured within the opening in said tank and extending chordwise across the tank, said conduit having a port therein to provide communication between the interior of the conduit and the tank, the center of mass of the motor-pump unit being displaced a substantial distance from the axis of the conduit to produce a moment arm about said conduit, means for connecting the upper end of the conduit to the outlet opening in said pump, and weld means for securing the lower end portion of the conduit to the inner surface of the tank to firmly secure the conduit to the tank and resist said moment arm.

References Cited in the file of this patent

UNITED STATES PATENTS

| | | |
|---|---|---|
| 1,595,027 | Sielaff | June 14, 1923 |
| 2,017,968 | Hetherington | Oct. 22, 1935 |
| 2,405,322 | Nisbet | July 10, 1945 |
| 2,631,539 | Wolfe et al. | Nov. 21, 1947 |

OTHER REFERENCES

Fairbanks-Morse Dealer Line Products, catalog #D104 (January 27, 1943).